United States Patent
Ge et al.

(10) Patent No.: US 10,438,300 B2
(45) Date of Patent: Oct. 8, 2019

(54) PRICING ADVERTISEMENTS PRESENTED BY A CLIENT DEVICE IN A LIMITED FUNCTIONALITY STATE

(71) Applicant: Facebook, Inc., Menlo Park, CA (US)

(72) Inventors: Hong Ge, Cupertino, CA (US); Robert William Cathcart, San Francisco, CA (US); Nimrod Hoofien, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 666 days.

(21) Appl. No.: 13/970,068

(22) Filed: Aug. 19, 2013

(65) Prior Publication Data

US 2015/0051980 A1  Feb. 19, 2015

(51) Int. Cl.
G06Q 30/02 (2012.01)
G06Q 50/00 (2012.01)

(52) U.S. Cl.
CPC ......... *G06Q 50/01* (2013.01); *G06Q 30/0269* (2013.01); *G06Q 30/0275* (2013.01)

(58) Field of Classification Search
None
See application file for complete search history.

(56) References Cited

U.S. PATENT DOCUMENTS

| 8,655,716 | B1 | 2/2014 | Barnes et al. | |
| 2002/0053078 | A1* | 5/2002 | Holtz | G06Q 30/06 725/14 |
| 2008/0092182 | A1* | 4/2008 | Conant | H04N 7/17318 725/109 |
| 2008/0147505 | A1 | 6/2008 | Davis | |
| 2011/0093320 | A1* | 4/2011 | Blake | G06Q 30/02 705/14.16 |
| 2011/0142486 | A1 | 6/2011 | Komiyama et al. | |
| 2011/0246302 | A1 | 10/2011 | Kwon et al. | |

(Continued)

FOREIGN PATENT DOCUMENTS

| AT | 377906 T | 11/2007 |
| DE | 60131251 T2 | 4/2008 |

(Continued)

OTHER PUBLICATIONS

Cain Evens and Philip Moore, An Intelligent Mobile Advertising System, 2012 Sixth International Conference on Complex, Intelligent, and Software Intensive Systems. (Year: 2012).*

(Continued)

*Primary Examiner* — Sam Refai
*Assistant Examiner* — Christopher C Busch
(74) *Attorney, Agent, or Firm* — Fenwick & West LLP (57) ABSTRACT

A social networking system prices advertisements presented to a user of a social networking system via a client device in a state that provides the user with limited functionality by applying discount factors to bid amounts associated with advertisements selected for presentation. A discount factor is based on the likelihood of the user viewing or interacting with an advertisement via the social networking system presented while the client device is in the state providing the user with limited functionality. This likelihood is determined based on information including a history of user interaction with the client device and contextual information indicating whether the client device is in use.

19 Claims, 2 Drawing Sheets

(56) References Cited

U.S. PATENT DOCUMENTS

| | | |
|---|---|---|
| 2011/0282742 A1 | 11/2011 | Umeda |
| 2012/0179542 A1 | 7/2012 | Findlan |
| 2012/0221657 A1 | 8/2012 | Zeevi et al. |
| 2013/0069962 A1 | 3/2013 | Nealer et al. |
| 2013/0124276 A1 | 5/2013 | Brown |
| 2013/0159105 A1 | 6/2013 | Kuchaiev et al. |
| 2013/0166381 A1 | 6/2013 | Umeda |
| 2013/0227476 A1* | 8/2013 | Frey .............. G06F 3/0488 715/810 |
| 2013/0283199 A1* | 10/2013 | Selig .............. G06F 3/0484 715/781 |
| 2014/0019253 A1 | 1/2014 | Ricasata |
| 2014/0156417 A1 | 6/2014 | Biswas et al. |
| 2014/0156451 A1* | 6/2014 | Goldman ........ G06Q 30/0631 705/26.8 |
| 2014/0172579 A1* | 6/2014 | Peterson ........ G06Q 30/0269 705/14.66 |
| 2014/0195353 A1 | 7/2014 | Govan et al. |
| 2014/0257994 A1 | 9/2014 | Conant |
| 2016/0085385 A1 | 3/2016 | Gao et al. |

FOREIGN PATENT DOCUMENTS

| | | |
|---|---|---|
| EP | 1391118 A1 | 2/2004 |
| KR | 10-2010-0057461 A | 5/2010 |
| KR | 10-2013-0000318 A | 1/2013 |
| WO | WO 2011/142486 A1 | 11/2011 |

OTHER PUBLICATIONS

PCT International Search Report and Written Opinion, PCT Application No. PCT/US2014/049699, dated Nov. 13, 2014, thirteen pages.
Canadian Office Action, Canadian Application No. 2,917,379, dated Jan. 27, 2017, 3 pages.
Canadian Office Action, Canadian Application No. 2,917,379, dated Dec. 27, 2017, 3 pages.
Canadian Office Action, Canadian Application No. 2,917,379, dated Nov. 26, 2018, 4 pages.
Japanese Office Action, Japanese Application No. 2016-536280, dated Aug. 7, 2018, 11 pages.

\* cited by examiner

PRICING ADVERTISEMENTS PRESENTED BY A CLIENT DEVICE IN A LIMITED FUNCTIONALITY STATE

BACKGROUND

This disclosure relates generally to social networking systems, and in particular to presenting advertisements to social networking system users.

Social networking systems allow users to connect to and communicate with other users of the social networking system. Users create profiles on the social networking system that are tied to their identities and include information about the users, such as interests and demographic information. The users may be individuals or entities such as corporations or charities. Because of the increasing popularity of social networking systems and the significant amount of user-specific information maintained by social networking systems, a social networking system allows a business or brand to increase awareness about its products or services via a social networking system. For example, presenting advertisements to social networking system users allows an advertiser to gain public attention for products or services or to persuade social networking system users to take an action regarding the advertiser's products, services, opinions, or causes. Social networking systems frequently charge advertisers for presenting advertisements to its users, allowing the social networking system to obtain revenue from advertisement presentation.

Users increasingly access social networking systems through mobile devices, or other devices that have one or more states providing users with limited functionality. For example, many devices have a "locked state" that responds to a reduced set of inputs from the user and passively displays information to a user. Conventional social networking systems may present a limited amount of content to users while a device associated with the user is in a state providing the user with limited functionality. While advertisements may be included in the content presented while a device is in a state providing limited functionality, these advertisements may prompt users to perform actions unable to be performed while the device is in the state providing limited functionality. This decreases the likelihood of a user performing an action associated with an advertisement presented while a device is in a state providing limited functionality.

SUMMARY

A social networking system communicates advertisements to a client device for presentation to a user by the client devices. One or more of the advertisements may be presented while the client device is in a state providing the user with limited functionality. For example, the advertisements are presented on a "lock screen" presented to the user while the client device is in a locked state that responds to a reduced set of inputs. However, advertisements presented while a client device is in the state providing the user with limited functionality may prompt users to perform actions unable to be performed while the client device is in a state of limited functionality.

To improve effectiveness of advertisements presented while a client device is in a state providing a user with limited functionality, a social networking system identifies an objective associated with various advertisements considered for presentation. Based on the objective associated with various advertisements, the social networking system determines interactions associated with the advertisements. For example, the social networking system identifies viewing an advertisement as an interaction associated with an advertisement having an objective of being presented to a user or identifies accessing a web page as an interaction associated with an advertisement having an objective of a user accessing a specified web page. When the social networking system receives a request to communicate one or more advertisements to a client device that indicates the client device is in a state providing a user with limited functionality, the social networking system identifies advertisements for communication to the client device that are not associated with one or more types of interactions. For example, the social networking system identifies advertisements having an objective that is not associated with user interaction or advertisements having an objective that is not associated with a user interacting with an entity external to the social networking system. Hence, the social networking system selects one or more advertisements associated with objectives satisfied by interactions capable of being performed while a client device is in a state providing the user with limited functionality. For example, advertisements that are not associated with a third-party landing page or that do not prompt a user to download objects, such as applications, are selected for communication to a client device. One or more of these selected advertisements are communicated to the client device for presentation.

Advertisements selected by the social networking system may be presented by the client device along with other content items in an "ambient feed" presented while the client device is in the state providing limited functionality. For example, the ambient feed presents stories or notifications describing actions performed by additional users of the social networking system that are connected to the user viewing the ambient feed. Other content items that do not prompt for user interaction may also be presented in the ambient feed.

To charge advertisers for presentation while a client device is in a state providing a user with limited functionality, the social networking system applies discount factors to bid amounts associated with advertisements sent to a client device for display while the device is in a state of limited functionality. Discount factors are based on a likelihood that an advertisement will be viewed by a user determined from data about the user being presented with the advertisements and about the client device. In one embodiment, historical user-specific interactions with the client device describing the frequency and extent of a user's interactions with the client device are used to determine discount factors. For example, the amount of time between display of the advertisement while the client device is in a state providing limited functionality and the most recent user interaction with the client device is used to determine a likelihood that an advertisement presented at a certain time while the client device is in a state providing limited functionality will be viewed by the user. A discount factor that is inversely proportional to the amount of time between presentation of an advertisement and the user's most recent interaction with the client device may be applied. Additionally, a smaller discount factor may be applied to provide a greater discount to advertisements displayed at times during which the user previously interacted with the client device less than a threshold number of times to account for a reduced likelihood of the user viewing advertisements during those times. For example, a discount factor for an advertisement that is likely to be viewed by a user receives a discount factor of 0.95, corresponding to a 5% discount, while an advertisement that is not likely to be viewed by a user receives a discount factor of 0.1, corresponding to a 90% discount.

Contextual information associated with the client device may also be used to determine discount factors for presenting advertisements. For example, a larger discount factor is applied to provide a smaller discount to advertisements displayed during times when the social networking system receives information indicating the client device is moving or is currently in use. Contextual information associated with the client device may be received from one or more sensors included on the client device, such as an accelerometer or microphone. A smaller discount factor may be applied to provide a larger discount to advertisements displayed during times when the social networking system receives information indicating the client device is not in use or has not been in use for a threshold amount of time.

Bid amounts associated with advertisements to be presented while a client device is in a state providing a user with limited functionality are modified by the discount factors, and the modified bid amounts used to select advertisements for presentation in the ambient feed. Alternatively, discount factors are applied to the price charged by the social networking system for presenting advertisements while a client device is in the state providing the user with limited functionality. Hence, the likelihood of a user viewing an advertisement presented while a client device is in a state providing a user with limited functionality affects the amount an advertiser is charged for presentation of the advertisement.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

System Architecture

Figure 1:
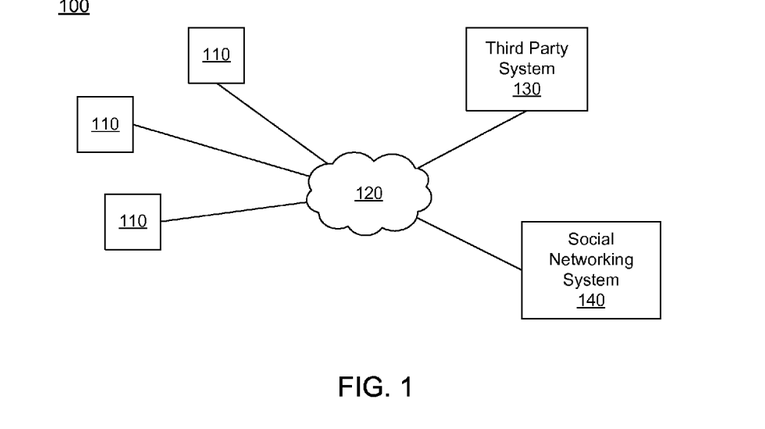
FIG. 1 is a block diagram of a system environment in which a social networking system operates, in accordance with an embodiment

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Figure 2:
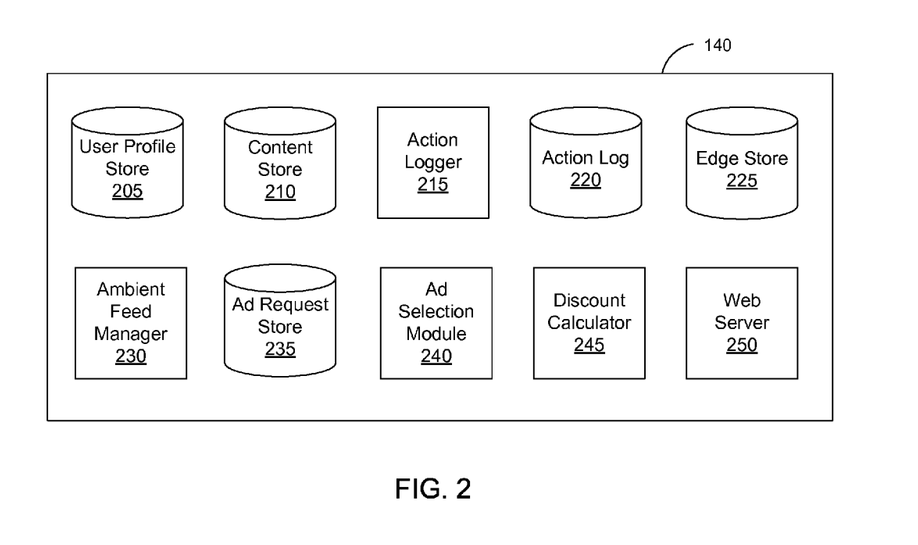
FIG. 2 is a block diagram of a social networking system, in accordance with an embodiment.

FIG. 2 is an example block diagram of an architecture of the social networking system 140. The social networking system 140 shown in FIG. 2 includes a user profile store 205, a content store 210, an action logger 215, an action log 220, an edge store 225, an ambient feed manager 230, an ad request store 235, an ad selection module 240, a discount calculator 245, and a web server 250. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No.

13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The ambient feed manager 230 identifies content items maintained by the social networking system 140 for presentation to a user while a client device 110 associated with the user is in a state that provides the user with limited functionality. For example, the ambient feed manager identifies stories describing actions performed by additional users connected to the user. Information associated with the user and stored by the edge store 225 or the action log 220 may be retrieved by the ambient feed manager 230 to identify additional users with which the user has at least a threshold affinity or actions previously performed by the user for identifying stories for presentation to the user. Stories may be generated by the ambient feed manager 230 based on information in the action log 220 and in the edge store 225 or may be retrieved from candidate stories included in the content store 210. As further described below in conjunction with FIG. 3, one or more advertisements from the ad request store 235 selected by the ad selection module 240 are identified for presentation while the client device 110 is in a state that provides the user with limited functionality.

A client device 110 may have different states of functionality. A state of functionality describes the ability of the client device 110 to interact with the user and the social networking system 140. For example, the client device 110 has a powered down state, where the user and the social networking system 110 are unable to interact with the client device 110, a powered on state where the client device 110 is capable of receiving and processing a full set of user inputs, or some state of limited functionality. As used herein, a client device 110 in a state of limited functionality may present content (e.g., advertisements and/or, content from the social networking system 140) to the user (e.g., via a "lock screen"), responds to a reduced set of inputs from the user, and is able to communicate with the social networking system 140. In one embodiment, a state of limited functionality occurs when the client device 110 is in a "locked state" where the client device 110 responds to a limited set of inputs. The locked state may occur based on an input from the user to the client device 110 to present a lock screen and respond to a limited set of inputs, may occur based on the client device 110 operating in a "low power state" (e.g., reduced voltage/reduced clock frequency of a CPU, etc.), or may occur based on any suitable condition.

One or more advertisement requests ("ad requests") are stored in the ad request store 235. An advertisement request includes advertisement content and a bid amount. The advertisement content is text data, image data, audio data, video data, or any other data suitable for presentation to a user. In various embodiments, the advertisement content also includes a network address specifying a landing page to which a user is directed when the advertisement is accessed.

The bid amount is associated with an advertisement by an advertiser and specifies an amount of compensation the advertiser provides the social networking system 140 if the advertisement is presented to a user or accessed by a user. In one embodiment, the bid amount is used by the online system to determine an expected value, such as monetary compensation, received by the social networking system 140 for presenting the advertisement to a user, if the advertisement receives a user interaction, or based on any other suitable condition. For example, the bid amount specifies a monetary amount that the social networking system 140 receives from the advertiser if the advertisement is displayed and the expected value is determined based on the bid amount and a probability of a user accessing the displayed advertisement.

An objective or conversion event may be associated with one or more advertisements. The objective may be specified by an advertiser to identify a desired action associated with presentation of an advertisement. For example, an objective indicates presentation of an advertisement to a user, accessing a web site associated with an advertisement, making a purchase from a web site associated with an advertisement, or other suitable action associated with an advertisement.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the social networking system 140. The targeting criteria may also specify interactions between a user and objects performed external to the social networking system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The ad selection module 240 selects one or more advertisements from the ad request store 235 for presentation to a social networking system user via a client device 110 in a state providing the user with limited functionality based on received information about the social networking system user and the client device 110. Based on an objective associated with one or more advertisements, the ad selection module 240 determines interactions associated with various advertisements and selects advertisements associated with interactions capable of being performed while the client device 110 is in the state providing the user with limited functionality. For example, the ad selection module 240 selects advertisements that do not prompt a user to interact with the advertisement, such as an informational advertisement for an upcoming episode of a television show. As an additional example, the ad selection module 240 selects advertisements that prompt a user to perform an interaction with the social networking system 140 capable of being performed without modifying the state of the client device 110, such as an advertisement that prompts a user to like or share a page for a brand maintained by the social networking system 140.

The ad selection module 240 may account for a pricing model associated with various advertisements when selecting advertisements for presentation while a client device 110 is in a state providing a user with limited functionality. For example, the ad selection module 240 limits selection of advertisements to those associated with cost-per-impression (CPM) pricing rather than cost-per-click (CPC) priced advertisements. As another example, the ad selection module 240 selects advertisements having a CPM pricing model or having a CPC pricing model and an association with interactions with objects maintained by the social networking system 140 for presentation while the client device is in a state providing the user with limited functionality.

The discount calculator 245 calculates a discount factor for presenting an advertisement while a client device 110 is in a state providing a user with limited functionality based on a likelihood that the user will view the advertisement. In various embodiments, the discount factor is applied to bid amounts associated with advertisements for selecting advertisements or is applied to the price charged to an advertiser by the social networking system 140 for presenting an advertisement while a client device is in a state providing a user with limited functionality. For example, a discount factor is based on the most recent time a user interacted with a client device 110. As an example, an advertisement presented while a client device 110 is in a state providing a user with limited functionality 30 seconds after a user interacted with the client device 110 receives no discount (e.g., a discount factor of 1.0), while an advertisement presented while the client device 110 is in a state providing a user with limited functionality three hours after the user last interacted with the client device receives a 95% discount (e.g., a discount factor of 0.05).

Contextual information about a client device 110 may be used to determine a discount factor. For example, a small discount factor or no discount factor is applied to advertisements displayed while the client device 110 is in a state providing a user with limited functionality when information from sensors, such as an accelerometer, on the client device 110 indicate the client device 110 is being moved or rotated. As another example, if the social networking system 140 receives information from a microphone on the client device 110 indicating the client device 110 is being used (e.g., the user is on the phone), a larger discount factor is applied to advertisements displayed while the client device 110 is in a state providing the user with limited functionality than if information from the client device 110 indicates the client device 110 is not currently in use.

Historical interactions between a user and a client device 110 may be used to determine a discount factor. For example, if information received from the client device 110 indicates a user's historical interactions with the client device 110 were greatest on Saturdays between 5 P.M. and 10 P.M., a smaller discount (i.e., a larger discount factor) is applied to advertisements displayed during these times than at other times. As an additional example, if historical interactions between the user and the client device indicates the user interacts with the client device 110 with at least a threshold frequency at 3 P.M. on Mondays, advertisements displayed while the client device 110 is in a state providing the user with limited functionality at 3 P.M. on Mondays are associated with a smaller discount (i.e., a larger discount factor) than advertisements displayed while the client device 110 is in the state providing the user with limited functionality at other times.

The web server 250 links the social networking system 140 via the network 120 to the one or more client devices 110, as well as to the one or more third party systems 130. The web server 250 serves web pages, as well as other web-related content, such as JAVA®, FLASH®, XML and so forth. The web server 250 may receive and route messages between the social networking system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that is stored in the content store 210. Additionally, the web server 250 may provide application programming interface (API) functionality to send data directly to native client device operating systems, such as IOS®, ANDROID™, WEBOS® or RIM®.

Selecting and Pricing Ambient Feed Advertisements

Figure 3:
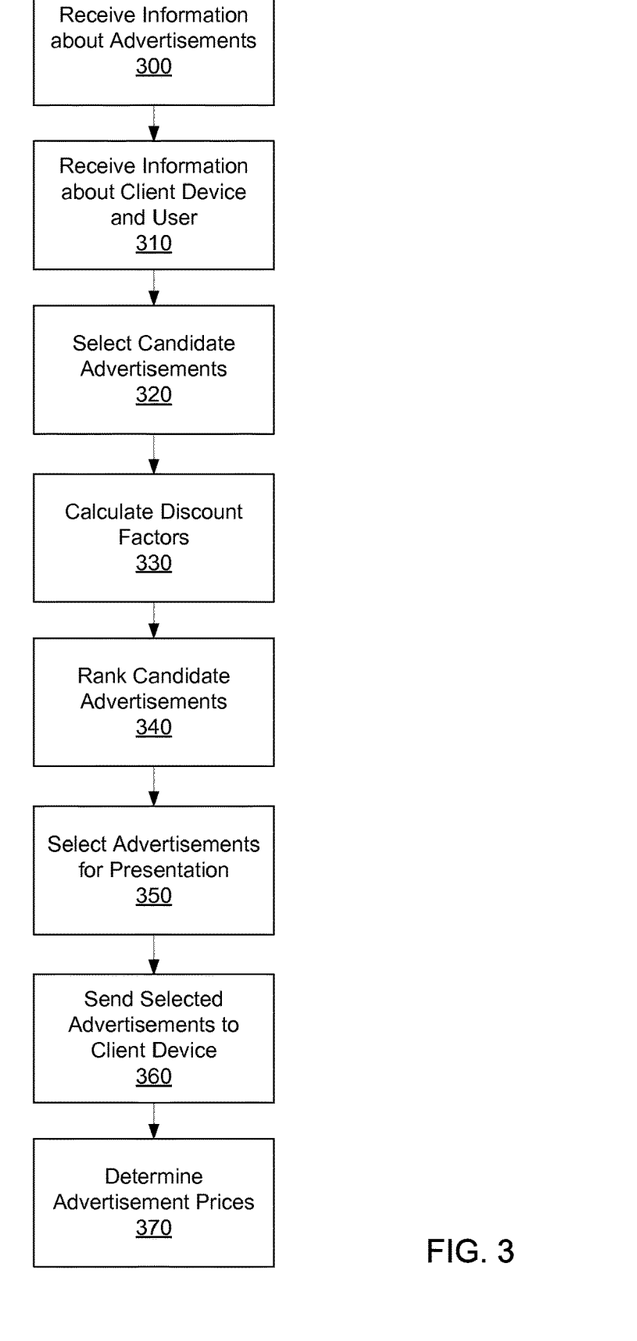
FIG. 3 is a flow chart of a method for selecting and pricing advertisements presented in an ambient feed of content items, in accordance with an embodiment.

FIG. 3 is a flow chart of one embodiment of a method for selecting and pricing advertisements presented via a client device 110 in a state providing a user with limited functionality. The social networking system 140 receives 300 information about advertisements from one or more advertisers. For example, the social networking system 140 receives 300 ad requests each including information about an advertisement, a bid amount associated with the advertisement, and an objective associated with the advertisement. The objective associated with an advertisement specifies a conversion event associated with presentation of the advertisement by an advertiser. In various embodiments, targeting criteria, display times, pricing models, or other suitable information are included in received ad requests.

The social networking system 140 receives 310 information about a user and a client device 110 associated with the user, such as interactions between the user and the client device 110. In one embodiment, the information is received 310 from the client device 110 when the client device 110 is in a state providing limited functionality, such as when the client device 110 is in a locked state responding to a limited set of inputs and communicates a limited amount of data via a network 120. Examples of information about the client device 110 include a time of a most recent interaction with the client device 110 by the user, an operating system (e.g., ANDROID™ or IOS®) and/or an operating system version of the client device 110, a size of a display device of the client device 110, a type of connection (e.g., 802.11, 3G, 4G, etc.) between the client device 110 and the network 120, and a service provider used by the client device 110 to communicate data via the network 120 (e.g., AT&T™, SPRINT®, etc.). The received information may include contextual information describing use of the client device 110. Examples of contextual information include: information describing movement of the client device 110 from a sensor included on the client device 110 (e.g., an accelerometer), information from a microphone of the client device 110 indicating sound information detected by a microphone of the client device 110 specifying whether the client device 110 is in use, and time zone information of the client device 110.

Received information about the user may include declarative information about the user from the user's user profile and historical actions performed by the user and identified in the action log 220 of the social networking system 140. Historical actions may be performed within the social networking system 140 on one or more third party systems 130 external to the social networking system 140. Examples of actions identified by the action log 220 include a user indicating a preference for a page post ("liking" the page post), providing a comment to a page, attending an event, or other suitable action. Retrieved information describing actions performed by the user may identify actions by the user performed via the client device 110, allowing the social networking system 140 to determine historical information describing the user's interactions with the client device 110. For example, timestamps associated with actions performed by the user and with the client device 110 allows the social networking system 140 to determine a time of day during which the user has a maximum number of interactions with the client device are greatest, a time of day a frequency of interactions that exceeds a threshold amount, or other suitable information describing user interaction. Additional examples of information about the user include additional users connected to the user via the social networking system 140 and actions associated with the additional users connected to the user. User information may include a geographic location associated with the user, which may be obtained from global positioning system information received from the client device 110, an internet protocol address of one or more devices from which the user accessed the social networking system 140, locations identified in status updates, messaging information, profile information, or other suitable information.

Based on the received information about the advertisements, as well as the received information about the user and the client device 110, the ad selection module 240 selects 320 one or more candidate advertisements for presentation while the client device 110 is in a state providing the user with limited functionality. The ad selection module 240 identifies a set of advertisements from the ad request store 235 eligible for presentation to the user. For example, a set of advertisements associated with one or more targeting criteria satisfied by characteristics of the user.

Interactions associated with each advertisement in the set are identified by the ad selection module 240 based on an objective associated with each advertisement in the set. For example, advertisements with an objective of a user downloading an application are identified as associated with a download interaction, advertisements with an objective of accessing a specific website are identified as associated with an access interaction, and advertisements with an objective of being presented to a user are associated with a presentation action. Based on the received information about the client device 110 and the user, the ad selection module 240 selects 320 advertisements from the set of advertisements associated with interactions capable of being performed while the client device 110 is in a state providing a user with limited functionality as candidate advertisements. For example, the ad selection module 240 selects advertisements that are not associated with an interaction where the user interacts with the advertisement or that are associated with an interaction with the social networking system 140 capable of being performed by the user without modifying the state of the client device 110 (e.g., indicating a preference or commenting to the social networking system 140 about an advertisement for an application or game). As an additional example, the ad selection module 240 selects 320 a candidate advertisement having an objective of being presented to social networking system users to increase awareness of an upcoming movie release or having an objective of being shared with additional social networking system users, which may be performed without modifying state of the client device 110.

The discount calculator 245 calculates 330 discount factors for each of the candidate advertisements based on a likelihood that a user views a candidate advertisement or a likelihood that the user interacts with the candidate advertisement via an action on the social networking system 140. For example, a user interacts with an advertisement via an action on the social networking system 140 by indicating a preference for the advertisement (i.e., "liking" the advertisement), commenting on the advertisement, sharing the advertisement, or some other action communicated to the social networking system 140. As described above in conjunction with FIG. 2, the likelihood of a user viewing and/or interacting with a candidate advertisement may be based on historical interactions between the user and the client device 110 determined from the received information about the user and about the client device 110. In various embodiments, a time of a most recent user interaction with the client device 110 or contextual information describing operation of the client device 110 are used to determine the likelihood of the user viewing and/or interacting with a candidate advertisement. For example, the discount factor associated with an advertisement displayed while a client device 110 is in a state providing a user with limited functionality 30 to 45 seconds after the user interacted with the client device 110 is subsequently applied to various advertisements displayed under similar conditions (i.e., limited functionality 30 to 45 seconds after the user interacted with the client device 110).

Selected candidate advertisements are ranked 340 based on their associated bid amounts. For example, advertisements with CPM pricing schemes are ranked 340 based on their associated bid amounts and advertisements with CPC pricing schemes are ranked 340 based on associated bid amounts and an expected click-through rates. In one embodiment, discount factors determined by the discount calculator 245 for various advertisements are applied to bid amounts associated candidate advertisements, so the candidate advertisements are ranked 340 based on their bid amounts after application of the discount factors. Based on the ranking, one or more advertisements are selected 350 for presentation. For example, candidate advertisements having at least a threshold position in the ranking are selected 350 or the candidate advertisements having the highest positions in the ranking are selected 350.

The selected advertisements for presentation are sent 360 to the client device 110 via the network. Additional content items for presentation while the client device 110 is in the state providing the user with limited functionality may also be sent 360 from the social networking system 140 to the client device 110 for presentation. For example, stories describing actions performed by additional users connected to the user viewing the ambient feed are sent 360. Instructions for modifying presentation of advertisements while the client device 110 is in the state providing the user with limited functionality may also be sent 360 to the client device 110. For example, instructions for automatically modifying the advertisements or other content items presented while the client device 110 is in the state providing the user with limited functionality. In some embodiments, the instructions may be to scroll through advertisements, where each advertisement is displayed for a particular time interval. In some embodiments, the client device periodically scrolls through a set of advertisements, so that over a time interval of a specific duration one or more of the advertisements are presented to the user multiple times. In some embodiments, the client device 110 periodically changes the advertisements presented while the client device 110 is in a state of limited functionality. In some embodiments, the instructions modify the advertisements or other content items in response to an interaction with the client device 110 by the user. Advertisements and content items may be interspersed in a single feed including content items and advertisements when presented to the user while the client device 110 is in the state providing the user with limited functionality or may be presented in different regions of a display presented to the user while the client device 110 is in the state providing the user with limited functionality. In some embodiments, the client device 110 may also control the order in which advertisements and content are presented or the duration of how long advertisements and content are presented when the client device 110 is in a state of limited functionality.

The discount factors associated with advertisements selected for presentation may be applied to the bid amounts associated with the presented advertisements to determine 370 a price charged to advertisers for presenting the advertisements. For example, based on a user's historical interactions with a client device 110, advertisers whose advertisements are displayed while the client device 110 is in a state providing the user with limited functionality during times the user has less than a threshold likelihood of interacting with the client device 110 receive a greater discount than advertisers whose advertisements are displayed during times the user has at least a threshold likelihood of interacting with the client device 110. In this example, a discount factor of 0.15 may be applied to advertisements presented when there is less than a threshold likelihood of the user interacting with the client device 110, while a discount factor of 0.9 may be applied advertisements displayed while the user has at least the threshold likelihood of interacting with the client device 110.

As an example of the method described above in conjunction with FIG. 3, the social networking system 140 receives 300 ad requests from advertisers DODGE®, FORD®, and FERRARI® and also receives 310 information about a user and a client device 110 associated with the user (e.g., device is in a state of limited functionality). In this example, the received information about the user indicates that the user is located in a mountainous area that receives a lot of snow. Based on the received information about the advertisements (e.g., targeting information and advertisement objectives), as well as the received information about the user and the client device 110 (e.g., the user is located in an area that receives lots of snow), the ad selection module 240 selects 320 one or more candidate advertisements for DODGE® and FORD® four-wheel drive (4WD) trucks for presentation while the client device 110 is in a state of limited functionality (e.g., low power state that may display advertisements and/or content from the social networking system 140).

The discount calculator 245 calculates 330 discount factors for each of the candidate advertisements based on a likelihood that a user views a candidate advertisement and/or interacts with a candidate advertisement via the social networking system 140 (e.g., likes, comments, etc.). Historical data associated with the user may indicate that 80% percent of the user's prior interactions occur within 5 minutes of the device entering a state of limited functionality, 15% of the user's past interactions occur between 5 and 60 minutes from the device entering a state of limited functionality, and the remaining 5% occur when the device has been in a state of limited functionality for more than 60 minutes. In this example, discount factors for advertisements presented within 5 minutes, between 5 and 60 minutes, and after 60 minutes, of the device entering a state of limited functionality are one (no discount), 0.50 (50% discount), and 0.25 (75% discount), respectively.

The selected candidate advertisements (i.e., the FORD® and DODGE® 4WD truck advertisements) are ranked 340 using their associated bid amounts. For example, the bid prices associated with advertisements for a 4WD FORD® F-150 trucks, a 4WD DODGE® RAM 1500, and a 4WD DODGE® RAM 3500 may be 0.85 cents, 0.66 cents, and 0.10 cents respectively. The social networking system 140 may have a threshold so that the two highest ranked advertisements are selected for presentation to the user. Based on the ranking, the advertisements for the 4WD FORD® F-150 and 4WD DODGE® RAM 1500 are selected 350 for presentation and are sent 360 to the client device 110. In one embodiment, the social networking system 140 also sends instructions describing the order in which advertisements are presented and the duration for presenting each advertisement to the client device 110. Alternatively, the client device 110 may determine the order of advertisement presentation and the timing for display of each advertisement. In this example, the highest-ranked advertisement for the 4WD FORD® F-150 is presented for the first 5 minutes after the client device 110 enters a state of limited functionality. After 5 minutes in the state of limited functionality, the second-ranked advertisement for the 4WD DODGE® RAM 1500 is displayed by the client device 110.

The client device 110 communicates information to the social networking system 140 identifying which advertisements were displayed and the time periods when the advertisements were displayed. Discount factors associated with the advertisements for the 4WD FORD® F-150 and 4WD DODGE® RAM are used to determine the price charged to advertisers for presentation of the advertisements. For example, FORD® is charged full price (0.85 cents) because the discount factor is 1 for the FORD® F-150 advertisement, while DODGE® is charged 0.33 cents (0.66*0.5) because the discount factor is 0.5 for the DODGE® RAM 1500 advertisement.

SUMMARY

The foregoing description of the embodiments have been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments are intended to be illustrative, but not limiting, of the scope of the embodiments, which is set forth in the following claims.

What is claimed is:

1. A method comprising:
   responsive to an indication that a client device of a user of a social networking system is in a state that provides limited functionality to the user, identifying one or more candidate advertisements from a plurality of advertisements, each candidate advertisement being associated with one or more interactions capable of being performed while the client device is in the state that provides limited functionality to the user, the limited functionality to the user comprising at least one of:
   responding to a reduced set of inputs by the client device operating in a locked state;
   providing limited interactions with the social networking system by the client device operating in a low power state; and
   presenting input to the user through a lock screen of the client device;
   selecting one or more advertisements from the one or more candidate advertisements for presentation to the user while the client device is in the state that provides limited functionality to the user based at least in part on bid amounts associated with each of the candidate advertisements, wherein the client device in the state that provides limited functionality to the user is configured to present content items in an ambient feed to the user, the ambient feed including stories or notifications describing actions performed by additional users of the social networking system connected to the user viewing the ambient feed; and
   computing a price for each of the one or more selected advertisements based at least in part on discount factors and bid amounts associated with each of the one or more selected advertisements, a respective discount factor for a respective selected advertisement being based on a likelihood of the user viewing the respective selected advertisement while the client device is in the state that provides limited functionality to the user.

2. The method of claim 1, wherein the client device in the state of limited functionality presents one or more selected advertisements to the user, responds to a reduced set of inputs from the user, and is able to receive one or more advertisements from the social networking system.

3. The method of claim 1, further comprising:
   identifying the one or more interactions associated with each advertisement from the plurality of advertisements based in part on an objective associated with presenting each advertisement from the plurality of advertisements to one or more users of the social networking system.

4. The method of claim 1, further comprising:
   computing the discount factors associated with each of the one or more selected advertisements based at least in part on information describing use of the client device and information associated with the user that is maintained by the social networking system.

5. The method of claim 4, wherein the information associated with the user that is maintained by the social networking system includes one or more selected from a group consisting of: a most recent interaction of the user with the client device, one or more prior interactions of the user with the client device, and any combination thereof.

6. The method of claim 4, wherein the information describing use of the client device includes one or more selected from a group consisting of: an indication that the client device is currently in use, a time during which the client device has at least a threshold likelihood of being in use, and any combination thereof, and wherein the indication that the client device is currently in use comprises an indication that the client device has captured audio data or an indication the client device is in motion.

7. The method of claim 4, wherein computing discount factors for each of the one or more selected advertisements based at least in part on the information describing use of the client device and the information associated with the user that is maintained by the social networking system comprises:
   determining a first likelihood that the client device is in use based on the information describing use of the client device;
   determining a second likelihood of the user viewing each of the one or more selected advertisements while the client device is in the state that provides limited functionality to the user based on the first likelihood and the information associated with the user that is maintained by the social networking system; and
   determining a discount factor associated with each of the selected one or more advertisements based on the second likelihood.

8. The method of claim 4, wherein the information describing use of the client device comprises one or more device parameters for the client device selected from a group consisting of: an operating system, a display size, a type of network connection, a service provider, and any combination thereof.

9. The method of claim 4, wherein the information associated with the user is selected from a group consisting of: information provided by the user and included in a user profile associated with the user by the social networking system, actions performed by the user on the social networking system, actions performed by the user on one or more third-party systems, information associated with one or more users of the social networking system connected to the user, a geographic location associated with the user, and any combination thereof.

10. A method comprising:
selecting one or more advertisements for presentation to a user of a social networking system through a client device that is in a state that provides limited functionality to the user based on interactions with the client device associated with the one or more advertisements, wherein the client device in the state that provides limited functionality to the user is configured to present content items in an ambient feed to the user, the ambient feed including stories or notifications describing actions performed by additional users of the social networking system connected to the user viewing the ambient feed, the limited functionality to the user comprising at least one of:
responding to a reduced set of inputs by the client device operating in a locked state;
providing limited interactions with the social networking system by the client device operating in a low power state; and
presenting input to the user through a lock screen of the client device; and
computing a price for each of the one or more selected advertisements based at least in part on discount factors and bid amounts associated with each of the one or more selected advertisements, a respective discount factor for a respective selected advertisement being based on a likelihood of the user viewing the respective selected advertisement while the client device is in the state that provides limited functionality to the user.

11. The method of claim 10, wherein the client device in the state of limited functionality presents one or more selected advertisements to the user, responds to a reduced set of inputs from the user, and is able to receive one or more advertisements from the social networking system.

12. The method of claim 10, further comprising:
computing the discount factors associated with each of the one or more selected advertisements based at least in part on information describing use of the client device and information associated with the user that is maintained by the social networking system.

13. The method of claim 12, wherein computing discount factors for each of the one or more selected advertisements based at least in part on the information describing use of the client device and the information associated with the user is maintained by the social networking system comprises:
determining a first likelihood that the client device is in use based on the information describing use of the client device;
determining a second likelihood of the user viewing each of the one or more selected advertisements while the client device is in the state that provides limited functionality to the user based on the first likelihood and the information associated with the user that is maintained by the social networking system; and
determining a discount factor associated with each of the selected one or more advertisements based on the second likelihood.

14. A system comprising:
a computer processor; and
a non-transitory computer-readable storage medium coupled to the computer processor, the computer-readable storage medium storing executable code, the code when executed by the computer processor causes the computer processor to perform steps comprising:
responsive to an indication that a client device of a user of a social networking system is in a state that provides limited functionality to the user, identifying one or more candidate advertisements from a plurality of advertisements, each candidate advertisement being associated with one or more interactions capable of being performed while the client device is in the state that provides limited functionality to the user, the limited functionality to the user comprising at least one of:
responding to a reduced set of inputs by the client device operating in a locked state;
providing limited interactions with the social networking system by the client device operating in a low power state; and
presenting input to the user through a lock screen of the client device;
selecting one or more advertisements from the one or more candidate advertisements for presentation to the user while the client device is in the state that provides limited functionality to the user based at least in part on bid amounts associated with each of the candidate advertisements, wherein the client device in the state that provides limited functionality to the user is configured to present content items in an ambient feed to the user, the ambient feed including stories or notifications describing actions performed by additional users of the social networking system connected to the user viewing the ambient feed; and
computing a price for each of the one or more selected advertisements based at least in part on discount factors and bid amounts associated with each of the one or more selected advertisements, a respective discount factor for a respective selected advertisement being based on a likelihood of the user viewing the respective selected advertisement while the client device is in the state that provides limited functionality to the user.

15. The system of claim 14, wherein the client device in the state of limited functionality presents one or more selected advertisements to the user, responds to a reduced set of inputs from the user, and is able to receive one or more advertisements from the social networking system.

16. The system of claim 14, wherein the code when executed by the computer processor causes the computer processor to perform steps further comprising:
identifying the one or more interactions associated with each advertisement from the plurality of advertisements based in part on an objective associated with presenting each advertisement from the plurality of advertisements to one or more users of the social networking system.

17. The system of claim 14, wherein the code when executed by the computer processor causes the computer processor to perform steps further comprising:
computing the discount factors associated with each of the one or more selected advertisements based at least in part on information describing use of the client device and information associated with the user that is maintained by the social networking system.

18. The method of claim 1, wherein the locked state of the client device is indicated by at least one of the following:
a clock screen presented by the client device for an input to the client device;
reduced voltage used by the client device; and reduced clock frequency of a computer processor of the client device.

19. The method of claim 1, wherein selecting one or more advertisements from the one or more candidate advertisements for presentation to the user while the client device is in the state that provides limited functionality to the user comprises:
  selecting an advertisement that requires the user to perform an interaction with the social networking system, the interaction capable of being performed by the user without modifying the state of the client device.

* * * * *